United States Patent
Johnson et al.

(10) Patent No.: US 9,594,599 B1
(45) Date of Patent: Mar. 14, 2017

(54) METHOD AND SYSTEM FOR DISTRIBUTING WORK BATCHES TO PROCESSING UNITS BASED ON A NUMBER OF ENABLED STREAMING MULTIPROCESSORS

(75) Inventors: Philip Browning Johnson, Campbell, CA (US); Dale L. Kirkland, Madison, AL (US); Karim M. Abdalla, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1802 days.

(21) Appl. No.: 12/579,143

(22) Filed: Oct. 14, 2009

(51) Int. Cl.
G06F 9/46 (2006.01)
G06F 9/50 (2006.01)
G06F 9/38 (2006.01)
G06F 9/48 (2006.01)

(52) U.S. Cl.
CPC .......... *G06F 9/5083* (2013.01); *G06F 9/5077* (2013.01); *G06F 9/3851* (2013.01); *G06F 9/4843* (2013.01); *G06F 9/5027* (2013.01); *G06F 9/5066* (2013.01)

(58) Field of Classification Search
USPC ............... 718/100, 101, 104, 105
See application file for complete search history.

(56) References Cited

U.S. PATENT DOCUMENTS

| | | | | |
|---|---|---|---|---|
| 5,357,632 A * | 10/1994 | Pian et al. | ............... | 718/105 |
| 6,026,425 A * | 2/2000 | Suguri et al. | ............... | 718/105 |
| 6,104,962 A * | 8/2000 | Sastry | ............... | 700/86 |
| 6,993,762 B1 * | 1/2006 | Pierre | ............... | 718/102 |
| 7,254,812 B1 * | 8/2007 | Menezes | ............... | 718/102 |
| 7,353,346 B2 * | 4/2008 | McKenney et al. | ............... | 711/154 |
| 7,502,948 B2 * | 3/2009 | Rotem et al. | ............... | 713/300 |
| 7,633,969 B2 * | 12/2009 | Caugherty | ........... | H04Q 3/0025 370/437 |
| 8,015,564 B1 * | 9/2011 | Beyer | ............... | G06F 9/505 718/100 |
| 8,028,293 B2 * | 9/2011 | Azar et al. | ............... | 718/105 |
| 8,051,174 B2 * | 11/2011 | Xiao | ............... | H04L 41/147 709/226 |

(Continued)

OTHER PUBLICATIONS

Mariani et al, A Design Space Exploration Methodology Supporting Run-Time Resource Management for Multi-Processor Systems-on-Chip, 2009, IEEE, pp. 21-28.*

(Continued)

*Primary Examiner* — Abu Ghaffari
(74) *Attorney, Agent, or Firm* — Artegis Law Group, LLP

(57) ABSTRACT

A work distribution unit distributes work batches to general processing clusters (GPCs) based on the number of streaming multiprocessors included in each GPC. Advantageously, each GPC receives an amount of work that is proportional to the amount of processing power afforded by the GPC. Embodiments include a method for distributing batches of processing tasks to two or more general processing clusters (GPCs), including the steps of updating a counter value for each of the two or more GPCs based on the number of enabled parallel processing units within each of the two or more GPCs, and distributing a batch of processing tasks to a first GPC of the two or more GPCs based on a counter value associated with the first GPC and based on a load signal received from the first GPC.

12 Claims, 12 Drawing Sheets

(56) References Cited

U.S. PATENT DOCUMENTS

| | | | | |
|---|---|---|---|---|
| 8,296,419 | B1* | 10/2012 | Khanna | G06F 9/5072 |
| | | | | 709/201 |
| 8,775,622 | B2* | 7/2014 | Wada | G06F 9/5072 |
| | | | | 709/223 |
| 2003/0005028 | A1* | 1/2003 | Dritschler et al. | 709/104 |
| 2003/0149716 | A1* | 8/2003 | Peterson | G06F 9/505 |
| | | | | 718/101 |
| 2008/0007765 | A1* | 1/2008 | Ogata et al. | 358/1.15 |
| 2008/0270610 | A1* | 10/2008 | John et al. | 709/226 |
| 2009/0017052 | A1* | 1/2009 | Bogoch | C12Q 1/701 |
| | | | | 424/185.1 |
| 2009/0049443 | A1* | 2/2009 | Powers et al. | 718/100 |

OTHER PUBLICATIONS

Sumanth et al, Adaptive Load-Balancing for Force-Decomposition Based 3-Body Molecular Dynamics Simulations in a Heterogeneous Distributed Environment with Variable Number of Processors, 2007, IEEE, ICPP, pp. 1-10.*

Kim et al, An Algorithm for Geometric Load Balancing with Two Constraints, 2004, IEEE, IPDPS'04, pp. 1-9.*

* cited by examiner

METHOD AND SYSTEM FOR DISTRIBUTING WORK BATCHES TO PROCESSING UNITS BASED ON A NUMBER OF ENABLED STREAMING MULTIPROCESSORS

BACKGROUND OF THE INVENTION

Field of the Invention

The present invention generally relates to computer hardware and more specifically to a method and system for distributing work batches to processing units.

Description of the Related Art

A modern computer system may include one or more processing units that operate in parallel to perform a variety of processing tasks. FIG. 1 illustrates one such computer system. As shown, computer system 10 includes processing units 12-1, 12-2, and 12-n. A work distribution unit 14 is coupled to each of the processing units 12 and distributes work batches 16-1, 16-2, and 16-n to processing units 12-1, 12-2, and 12-n, respectively. As referred to herein, a "work batch" includes a set of processing tasks to be performed by a particular processing unit 12. Work distribution unit 14 distributes work batch 16-1 to processing unit 12-1, work batch 16-2 to processing unit 12-2, and work batch 16-n to processing unit 12-n. Processing units 12-1, 12-2, and 12-n then perform the processing tasks specified by work batches 16-1, 16-2, and 16-n using processors 18-1, 18-2, and 18-n, respectively.

Work distribution unit 14 may distribute work batches 16 to processing units 12-1 to 12-n based on a variety of well-known distribution policies. One example of a distribution policy is referred to in the art as a "round-robin" policy. According to the round-robin policy, the work distribution unit transmits a work batch to each processing unit 12 in the sequence of processing units 12-1 to 12-n. When work distribution unit 14 reaches the end of the sequence (processing unit 12-n), the work distribution unit returns to the beginning of the sequence (processing unit 12-1) and continues to distribute additional work batches 16 to the sequence of processing units 12-1 to 12-n, starting with processing unit 12-1. When work distribution unit 14 reaches a processing unit 12 that has not yet finished processing a work batch 16 that was previously distributed to that processing unit 12, work distribution unit 14 stalls until processing unit 12 has finished processing the previously distributed work batch 16.

One problem with this approach is that processing units 12 may not all have equivalent processing capabilities. For example, processing unit 12-1 may include just one processor 18-1, while processing units 12-2 and 12-n may each include more than one processing units. Thus, processing unit 12-1 may require a disproportionate amount of time to finish processing work batch 16-1 compared to the amount of time required by processing units 12-2 and 12-n to finish processing work batches 16-2 and 16-n, respectively. Consequently, work distribution unit 14 may repeatedly become stalled when attempting to distribute additional work batches to processing unit 12-1, thereby reducing the processing throughput of the computer system 10.

In addition, certain work batches 16 may require significantly more processing time to complete than others due to variance in the complexity of the processing tasks required to complete each batch 16. Accordingly, the work distribution unit 14 may become stalled while waiting for a processing unit 12 to finish processing a batch 16 of increased complexity, thus further reducing the throughput of the computer system 10. When a processing unit 12 that has diminished processing capabilities receives a batch 16 of increased complexity relative to other batches 16, the processing throughput of the computer system 10 may be reduced dramatically.

A common solution to this problem is to cause each processing unit 12 to assert a "load" signal to work distribution unit 14 when the processing of a work batch 16 is complete. For example, processing unit 12-1 could assert a load signal 20-1 when the processing of work batch 16-1 is complete. Likewise, processing unit 12-2 could assert a load signal 20-2 when the processing of work batch 16-2 is complete, and processing unit 12-n could assert a load signal 20-n when the processing of work batch 16-n is complete. When a given processing unit 12 has not asserted the load signal 20, work distribution unit 14 skips that processing unit 12 when distributing work batches 16 to the sequence of processing units 12-1 to 12-n. Through this technique, work distribution unit 14 cannot be stalled by a processing unit 12 that has not yet finished processing a batch 16 because such a processing unit 12 is simply skipped.

However, work distribution unit 14 may have to wait for the transmission of load signal 20 to complete. Once transmission of load signal 20 is complete, work distribution unit 404 then requires additional time to transmit a batch 16 to the processing unit 12 that transmitted load signal 20. These latencies correspond to idle cycles on the processors 18, which inhibit the performance of the computer system 10.

One approach to solving this problem is to include a work FIFO within each processing unit 12. As shown, processing units 12-1, 12-2, and 12-n include work FIFOs 22-1, 22-2, and 22-n. Each work FIFO 22 stores a plurality of work batches 16 received from work distribution unit 14. When space becomes available within a given FIFO 22, work distribution unit 14 distributes an additional work batch 16 to that FIFO 22. Although this approach may reduce the idle cycles on the processors 18, it allows work to complete massively out of order and it may leave one processor with a large queue of long work when the computer system 10 is waiting for idle.

As the foregoing illustrates, what is needed in the art is a more effective technique for distributing work batches to processing units that have different processing capabilities.

SUMMARY OF THE INVENTION

Embodiments of the invention include a method for distributing batches of processing tasks to two or more general processing clusters (GPCs), including the steps of updating a counter value for each of the two or more GPCs based on the number of enabled parallel processing units within each of the two or more GPCs, and distributing a batch of processing tasks to a first GPC of the two or more GPCs based on a counter value associated with the first GPC and based on a load signal received from the first GPC.

Advantageously, each GPC receives an amount of work from the work distribution unit (WDU) that is proportional to the processing power afforded by the GPC. In addition, the WDU may abstain from distributing work batches to some or all of the GPCs in order to balance the workload across all of the GPCs.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
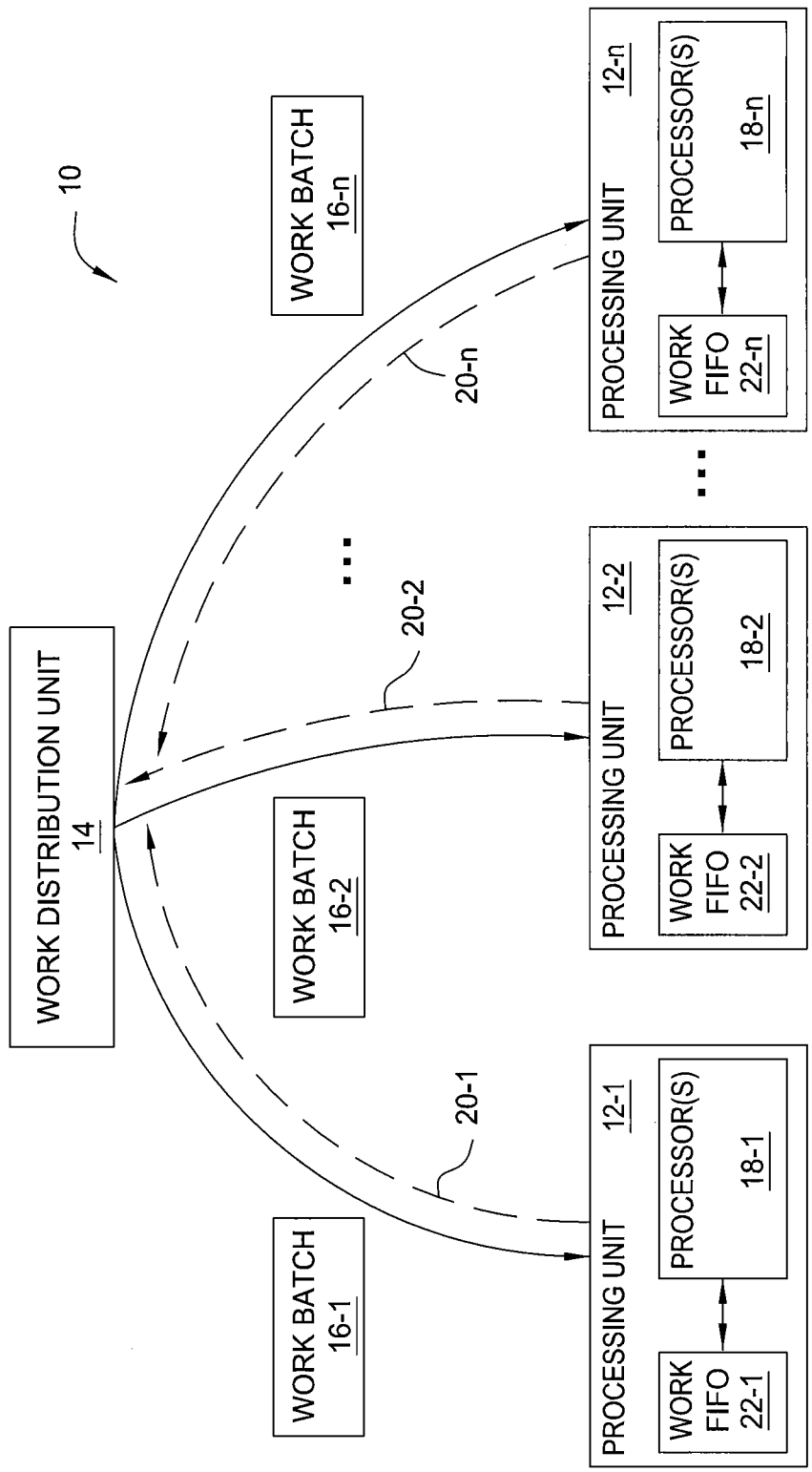
FIG. 1 is a prior art system configured to facilitate the distribution of work batches to processing units.
Figure 2A:
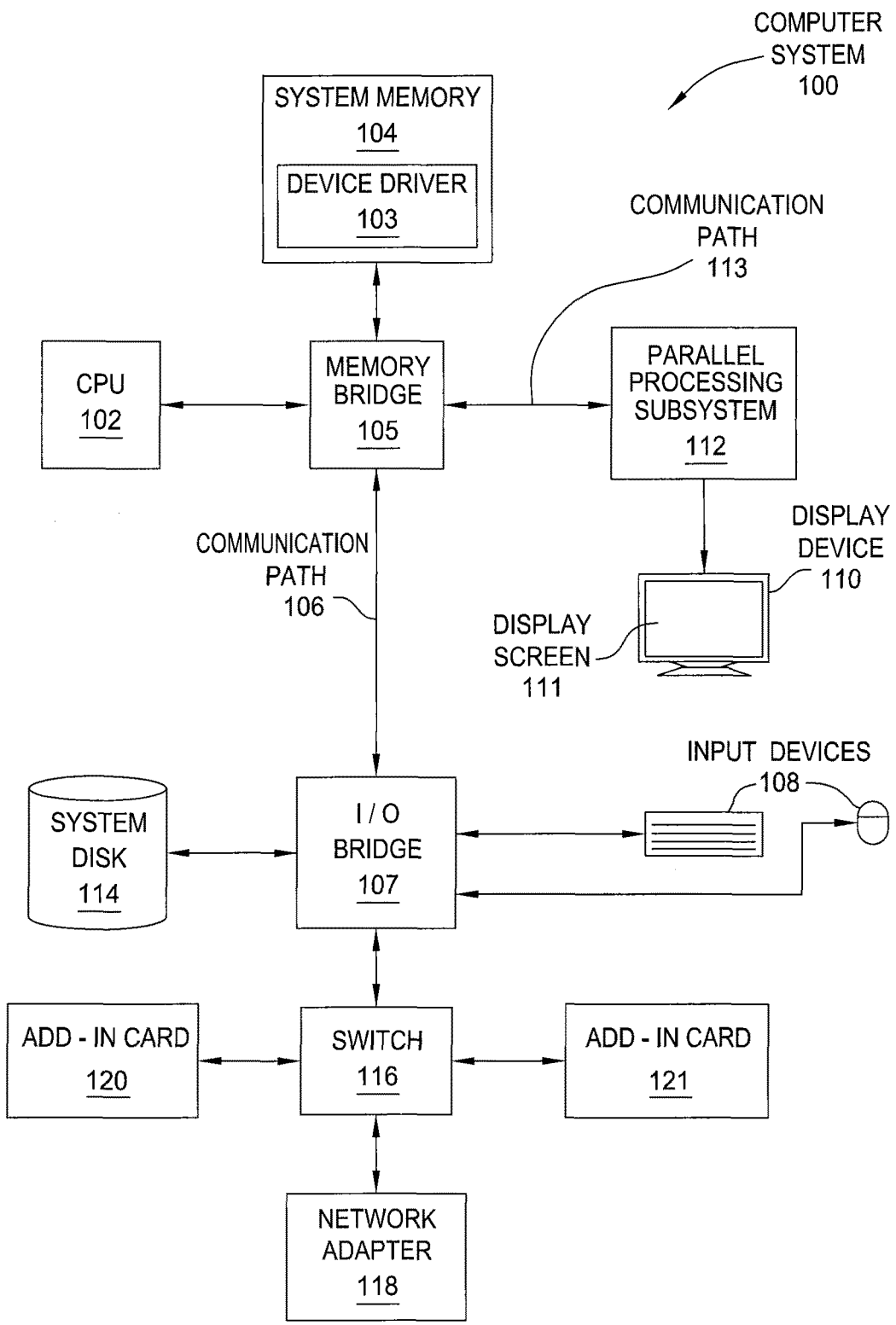
FIG. 2A is a block diagram illustrating a computer system configured to implement one or more aspects of the invention.

FIG. 2A is a block diagram illustrating a computer system 100 configured to implement one or more aspects of the invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2B:
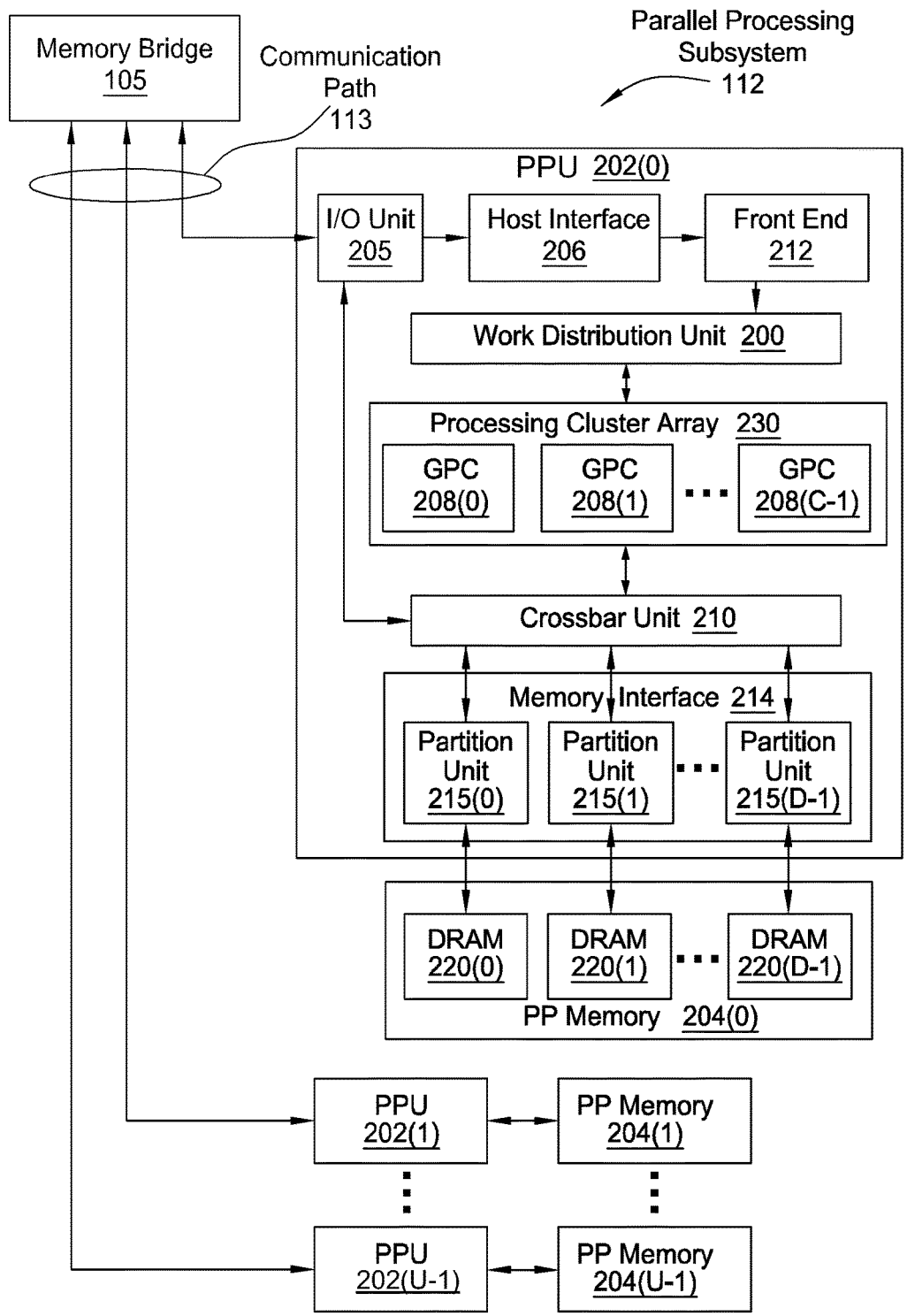
FIG. 2B is a block diagram of a parallel processing subsystem for the computer system of FIG. 1, according to one embodiment of the invention.

FIG. 2B illustrates a parallel processing subsystem 112, according to one embodiment of the invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2B, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
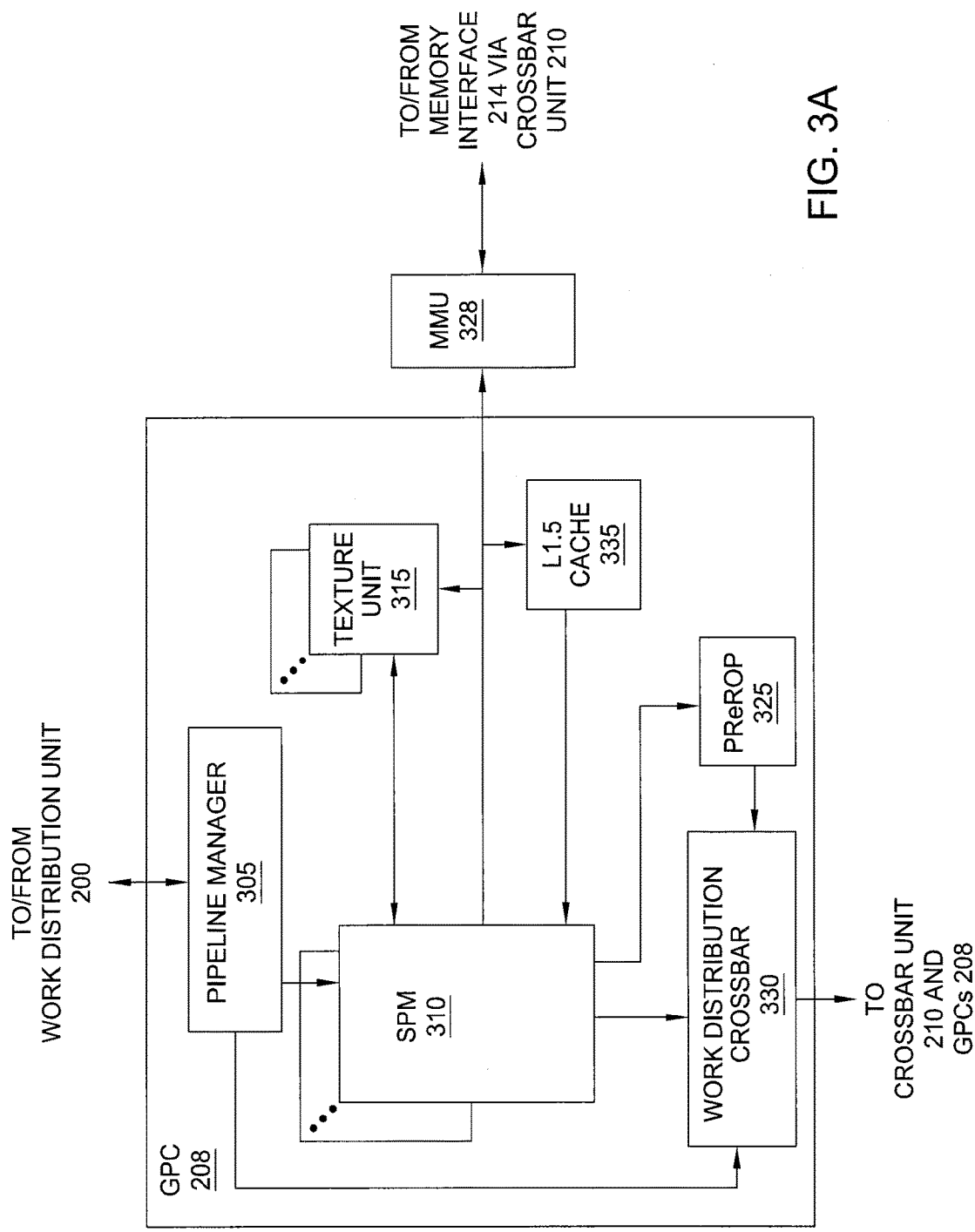
FIG. 3A is a block diagram of a GPC within one of the parallel processing units (PPUs) of FIG. 2, according to one embodiment of the invention.

FIG. 3A is a block diagram of a GPC 208 within one of the PPUs 202 of FIG. 2B, according to one embodiment of the invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where $M \geq 1$, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
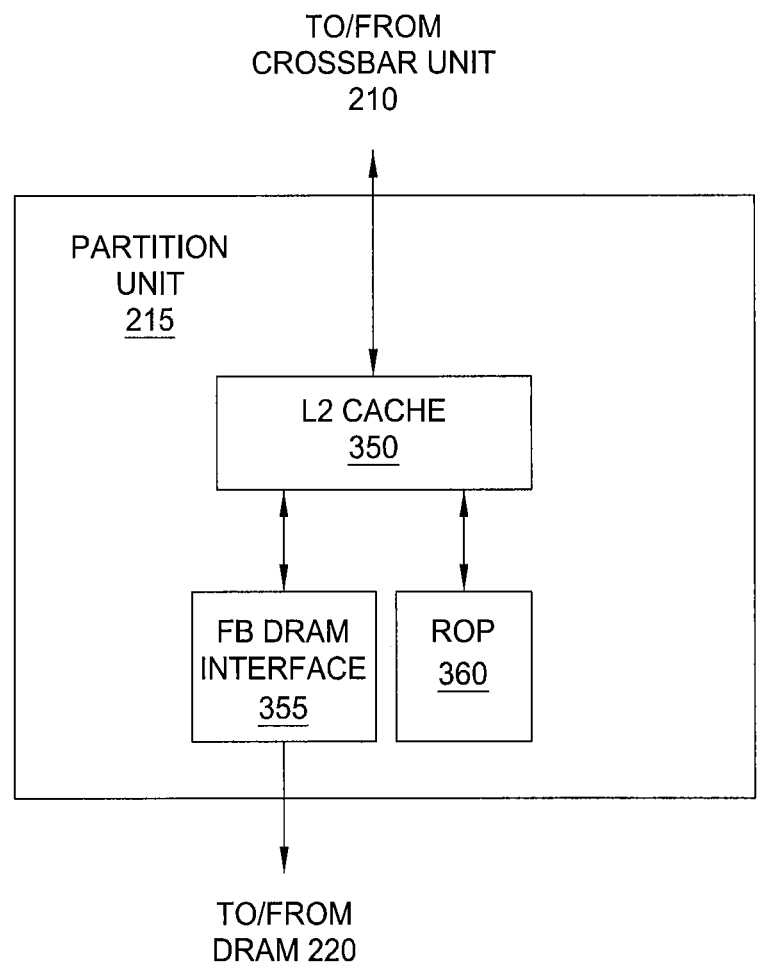
FIG. 3B is a block diagram of a partition unit within one of the PPUs of FIG. 2, according to one embodiment of the invention.

FIG. 3B is a block diagram of a partition unit 215 within one of the PPUs 202 of FIG. 2B, according to one embodiment of the invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2A, 2B, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
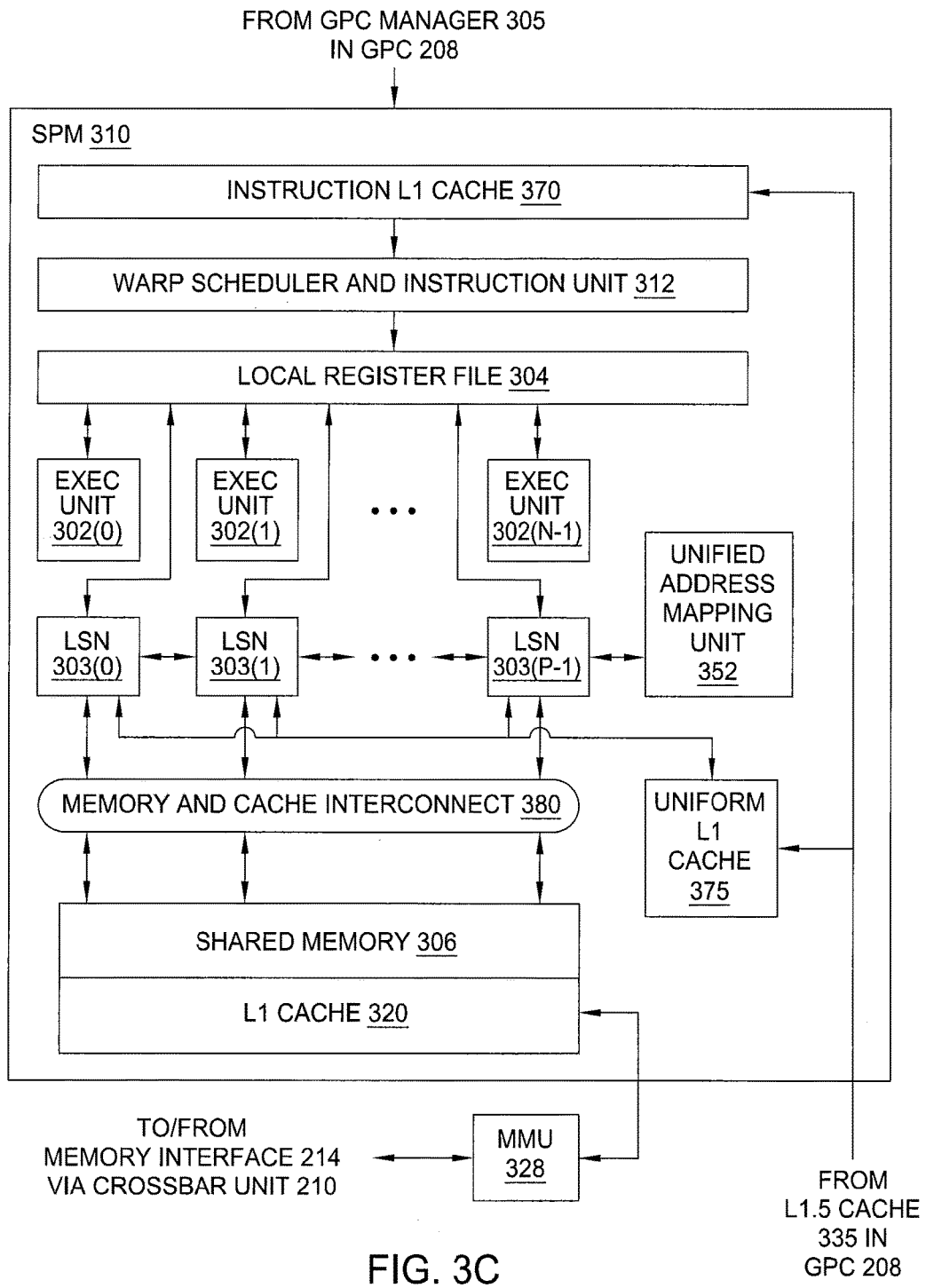
FIG. 3C is a block diagram of a portion of the SPM of FIG. 3A, according to one embodiment of the invention.

FIG. 3C is a block diagram of the SPM 310 of FIG. 3A, according to one embodiment of the invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Figure 4:
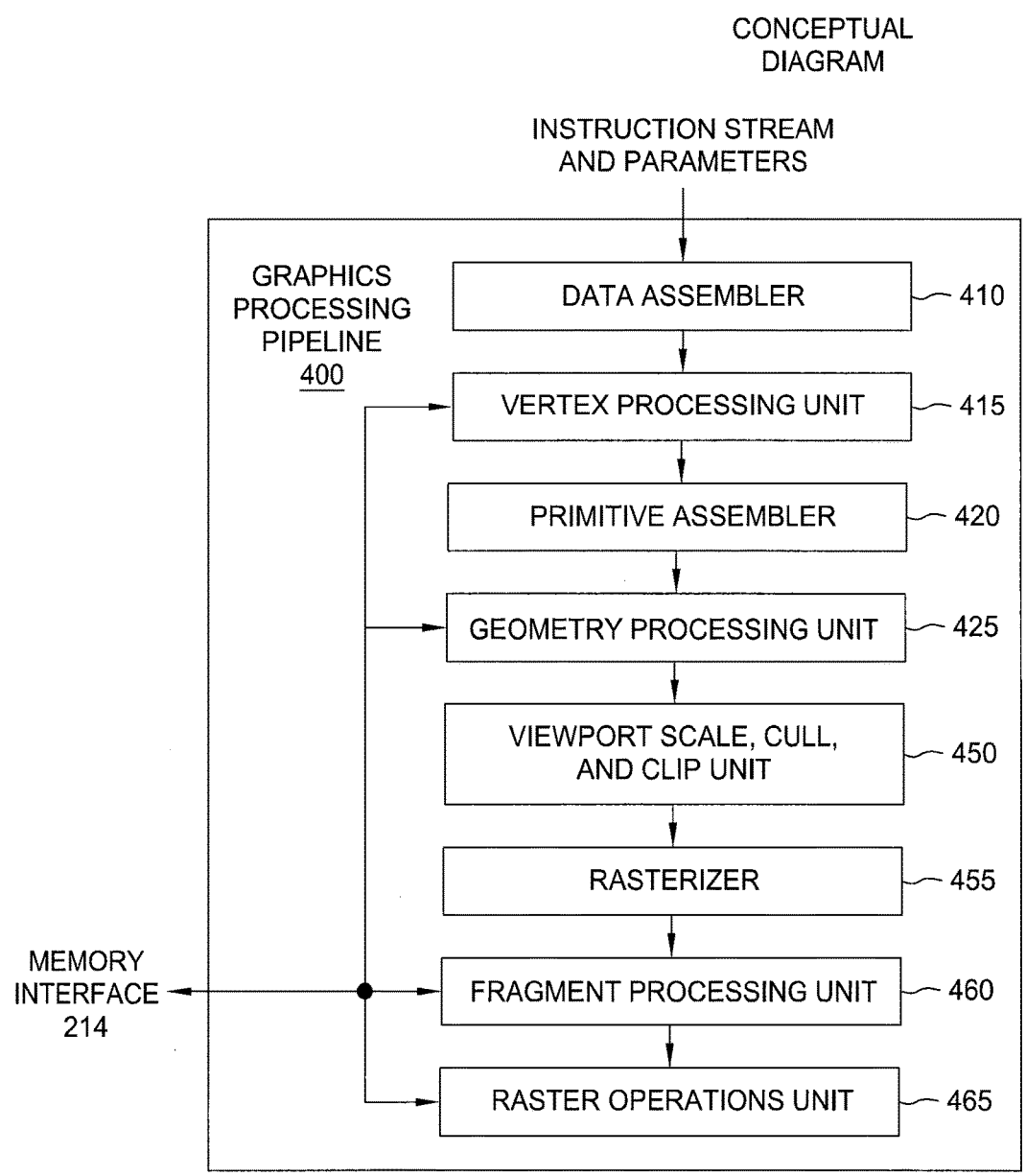
FIG. 4 is a conceptual diagram of a graphics processing pipeline that one or more of the PPUs of FIG. 2 can be configured to implement, according to one embodiment of the invention.

FIG. 4 is a conceptual diagram of a graphics processing pipeline 400, that one or more of the PPUs 202 of FIG. 2 can be configured to implement, according to one embodiment of the invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Batch Distribution Policy

Figure 5:
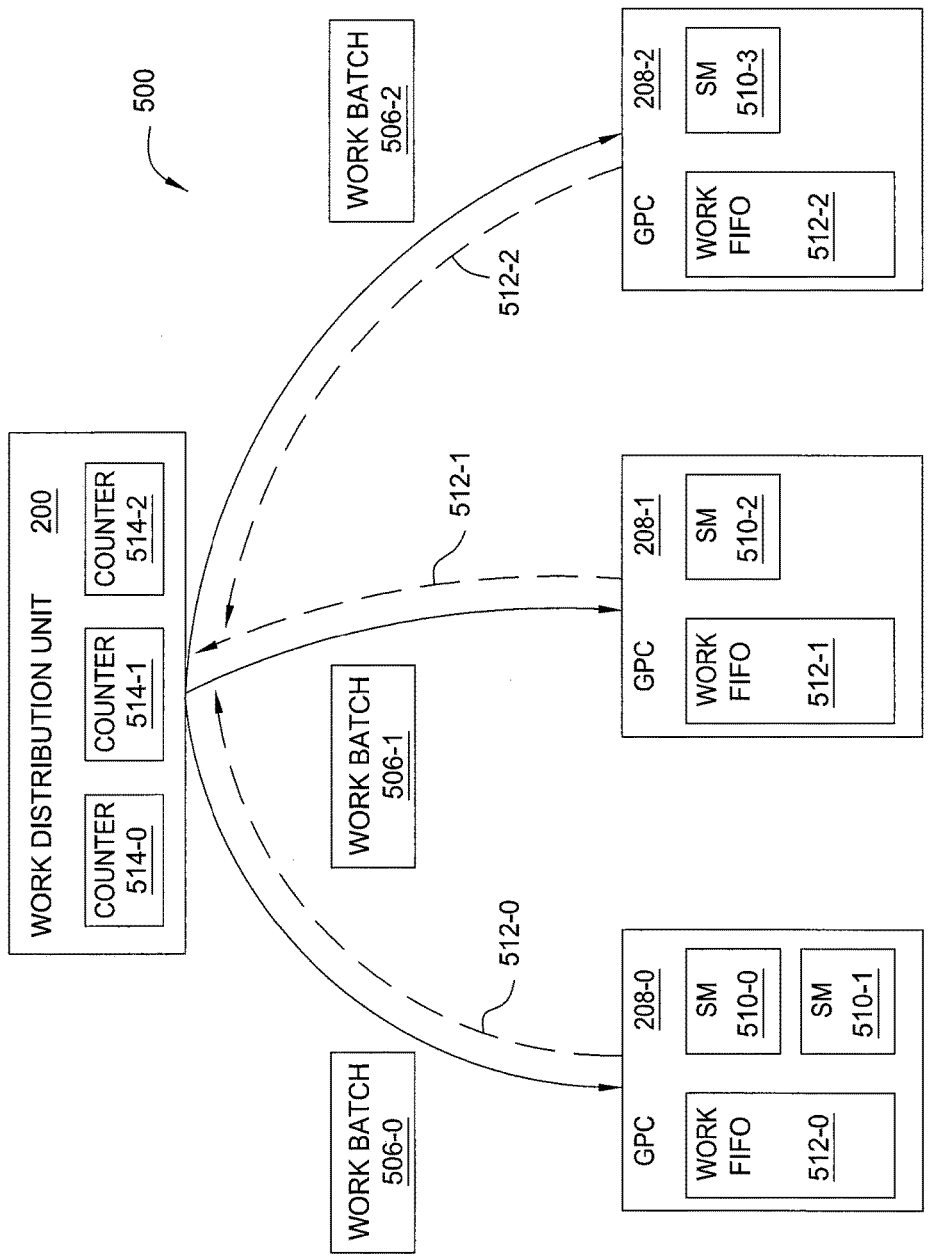
FIG. 5 is a system configured to facilitate the distribution of work batches to general processing clusters (GPCs), according to one embodiment of the invention.

FIG. 5 is a system 500 configured to facilitate the distribution of work batches to GPCs 208-0 through 208-2, according to one embodiment of the invention. FIG. 5 illustrates multiple instances of specific units (e.g., GPCs 208-0, 208-1, and 208-2, etc.). However, in the following description these units will be referred to generically (e.g., GPCs 208).

As shown, system 500 includes WDU 200 coupled to GPCs 208. WDU 200 is configured to distribute work batches 506 to GPCs 208. When a given GPC 208 receives a work batch 506, GPC 208 places the received work batch 506 in a work FIFO 512 included therein. Each GPC 208 also includes one or more SMs 510. When work FIFO 512 includes one or more work batches 506, SMs 510 residing within GPC 208 may perform processing operations involving those work batches to generate pixels for output to a display device. When work FIFO 512 includes an amount of work batches that is less than a predetermined amount, GPC 208 transmits a "load" signal 516 to WDU 200. In response to load signal 516, WDU 200 may transmit additional work batches 506 to the GPC 208 that issued the load signal 516. In other implementations, GPC 208 transmits a "credit" or "done" signal which informs WDU 200 that the GPC 208 can receive another piece of work.

As shown, GPCs 208 include different numbers of SMs 510. GPC 208-0 includes SMs 510-0 and 510-1, GPC 208-1 includes SM 510-2, and GPC 208-2 includes SM 510-3. GPCs 208 may also include any number of disabled SMs 510 (not shown). Certain SMs 510 within a GPC 208 may be disabled due to manufacturing defects, or, alternatively, because the manufacturer of parallel processing subsystem 112 intentionally disabled those SMs 510. For example, the manufacturer of parallel processing subsystem 112 may disable certain SMs 510 in order to provide a low-cost version of parallel processing subsystem 112 having reduced processing power. In addition, parallel processing subsystem 112 may dynamically cause certain SMs 510 to be disabled and/or may cause certain SMs 510 to be re-allocated for processing operations other than those associated with handling work batches 506.

Those skilled in the art will recognize that the number of enabled SMs 510 shown in FIG. 5 and the number of GPCs 208 that include those SMs corresponds to just one exemplary configuration of system 500, and, further, that other configurations of system 500 comprising different numbers of enabled SMs 510 and GPCs 208 are equally within the scope of the invention.

Figure 6:
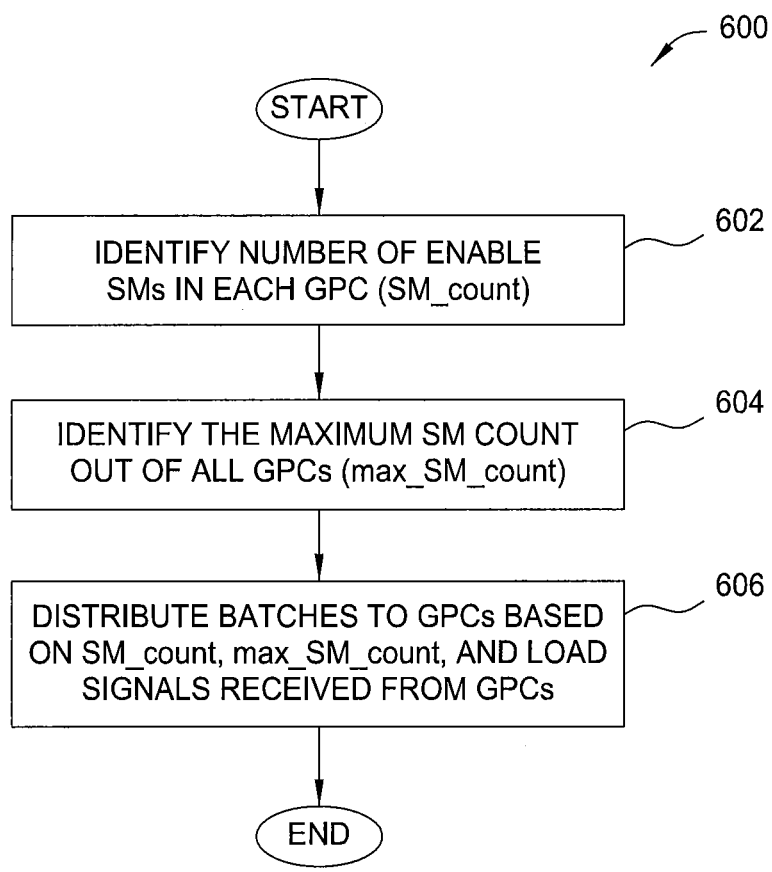
FIG. 6 is a flowchart of method steps for distributing work batches to GPCs, according to one embodiment of the invention.

WDU 200 is configured to distribute work batches 506 to GPCs 208 based on the number of enabled SMs 510 included within each GPC 208, the maximum number of enabled SMs 510 included in any of the GPCs 208, and load signals 516 received from GPCs 208, as described in conjunction with FIG. 6.

FIG. 6 is a flowchart of method steps for distributing work batches to GPCs, according to one embodiment of the invention. Although the method steps are described in conjunction with the systems of FIGS. 1, 2, 3A, 3B, and 3C, and 5, persons skilled in the art will understand that any system configured to perform the method steps, in any order, is within the scope of the invention.

As shown, the method 600 begins at step 602, where WDU 200 determines the number of enabled SMs 510 within each GPC 208, referred to herein as "SM_count." In the exemplary configuration shown in FIG. 5, the SM_count of GPCs 208-0, 208-1, and 208-2 are two, one, and one, respectively. At step 604, WDU 200 identifies the maximum SM_count out of all GPCs 208 which, in the exemplary configuration shown in FIG. 5, is equal to two. At step 606, WDU 200 distributes work batches 506 to GPCs 208 based on the SM_count for each GPC 208, the max_SM_count, and load signals 512 received from GPCs 208.

When performing step 606, WDU 200 may implement one of several different work distribution policies, or simply "policies." A first policy is described below in conjunction with FIG. 7. A second policy is described below in conjunction with FIG. 8, and a third policy is described below in conjunction with FIG. 9.

Referring back now to FIG. 5, when implementing a given policy to distribute work batches 506, WDU 200 performs a "scheduling round" and one or more "distribution rounds." When performing the scheduling round, WDU 200 determines which GPCs 208, if any, are scheduled to receive work batches 506. When performing the distribution rounds, WDU 200 distributes work batches 506 to the GPCs 208 scheduled to receive work batches 506. Once all such GPCs 208 have received work batches 506, WDU 200 again performs a scheduling round and determines which, if any, GPCs 208 are scheduled to receive work batches 506 during subsequent distribution rounds. In one embodiment, WDU 200 distributes one or more work batches 506 to GPCs 208 in a single distribution round and/or scheduling round.

WDU 200 determines whether to schedule each GPC 208 to receive a work batch 506 based on the policy implemented by WDU 200 and based on a counter 514 associated with the GPC 208. Counter 514-0 corresponds to GPC 208-0, counter 514-1 corresponds to GPC 208-1, and counter 514-1 corresponds to GPC 208-2. WDU 200 increments and decrements each counter at different times depending on the specific policy currently being implemented by WDU 200. Then, based on the value of the counter 514, WDU 200 determines whether to schedule the GPC 208 corresponding to that counter to receive a work batch 506 during a subsequent distribution round. The first policy is described below in conjunction with FIG. 7.

Figure 7:
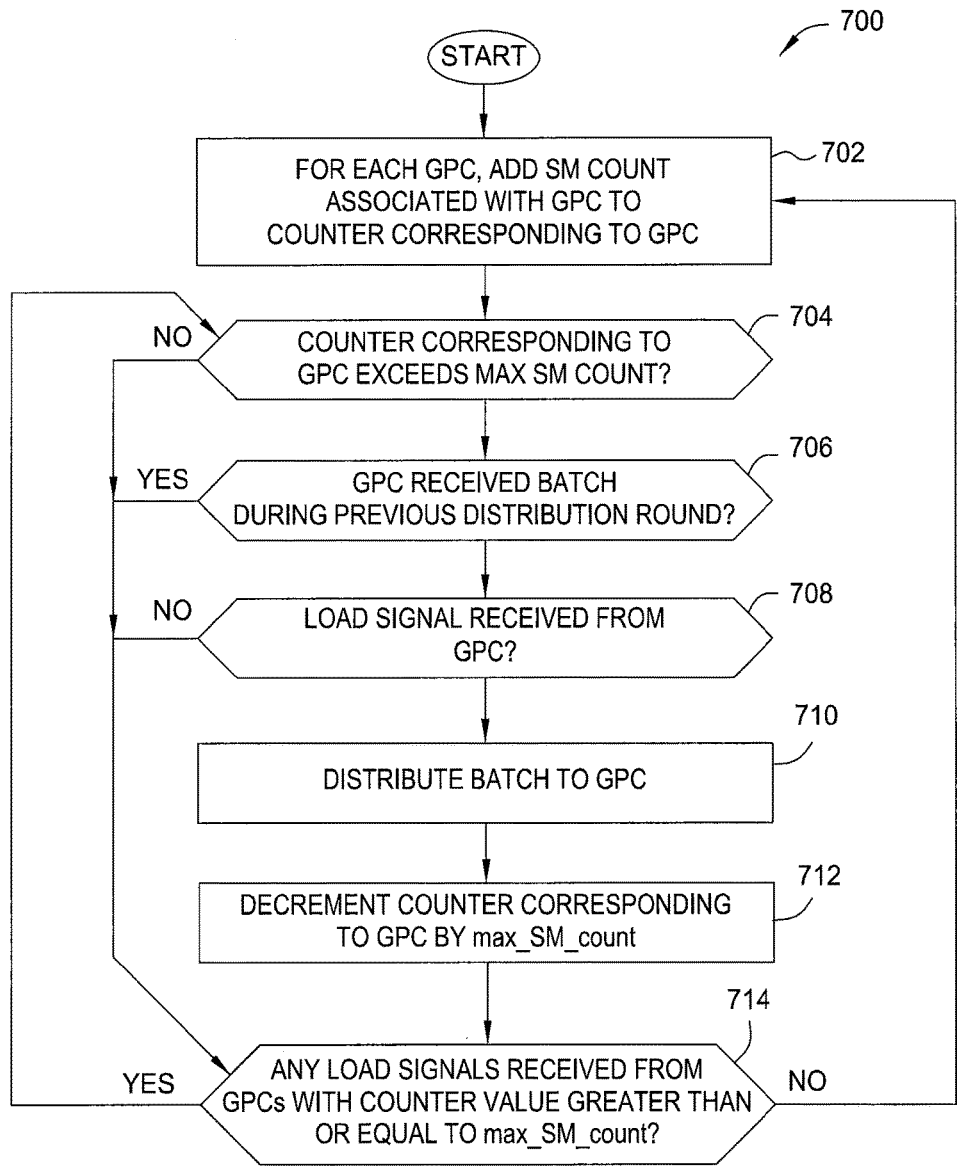
FIG. 7 is a flowchart of method steps for distributing work batches to GPCs in a modified round-robin fashion, according to one embodiment of the invention.

FIG. 7 is a flowchart of method steps for distributing work batches to GPCs in a modified round-robin fashion, according to one embodiment of the invention. Although the method steps are described in conjunction with the systems of FIGS. 1, 2, 3A, 3B, and 3C, and 5, persons skilled in the art will understand that any system configured to perform the method steps, in any order, is within the scope of the invention.

According to the first policy, as implemented by the method 700 described herein, WDU 200 increments each counter 514 at each scheduling round by the number of SMs 510 included in the corresponding GPC 208 (SM_count). When a given counter 514 is greater than or equal to the maximum number of SMs 510 included in any GPC 208 (max_SM_count), and when the GPC 208 associated with the counter 514 has issued load signal 516, WDU 200 distributes a work batch 506 to the GPC 208 and decrements the counter 514 associated with the GPC 208 by max_SM_count.

The method 700 begins at step 702, where, for each GPC 208, WDU 200 adds SM_count associated with the GPC 208 to the counter 514 corresponding to the GPC 208. SM_count represents the number of enabled SMs 510 within the GPC 308. WDU 200 may update each counter 514 in parallel, or, alternatively, in serial. The counters 514 may have any initial value. For example, counters 514 could have a value left over from a previous series of distribution rounds. Counters 514 may also be set to zero initially, or, alternatively, initialized to a specific value when WDU 200 begins distribution.

The method 700 then iterates over steps 704, 706, 708, 710, and 712 for each GPC 208 in the sequence of GPCs 208. For the sake of clarity, the following description of these steps is directed towards the sequence of steps performed for a single GPC 208.

At step 704, WDU 200 determines whether counter 514 corresponding to GPC 208 is greater than or equal to max_SM_count. If WDU 200 determines that counter 514 is not greater than or equal to max_SM_count, then the method 700 proceeds to step 714. However, if WDU 200 determines that counter 514 is greater than or equal to max_SM_count, then the method 700 proceeds to step 706.

At step 706, WDU 200 determines whether GPC 208 received a work batch 506 during the previous distribution round. WDU 200 avoids distributing work batches to any GPC 208 twice in a row (i.e., on two or more consecutive distribution rounds). If WDU 200 determines that GPC 208 received a work batch 506 during the previous distribution round, then WDU 200 does not distribute a work batch 506 to GPC 208 and the method 700 proceeds to step 714. In one embodiment, WDU 200 identifies a GPC that did not receive a work batch 506 during the previous distribution round and distributes a work batch 506 to that GPC instead of distributing to GPC 208.

If WDU 200 determines that GPC 208 did not receive a work batch 506 during the previous distribution round, then the method 700 proceeds to step 708. At step 708, WDU 200 determines whether load signal 516 has been received from GPC 208. If WDU 200 determines that load signal 516 has not been received from GPC 208, then the method 700 proceeds to step 714 and WDU 200 does not schedule GPC 208 to receive a work batch 506. However, if WDU 200 determines that load signal 516 has been received from GPC 208, then the method 700 proceeds to step 710 and WDU 200 distributes a work batch 506 to GPC 208. At step 712, WDU 200 decrements counter 514 corresponding to GPC 208 by max_SM_count. The method 700 then proceeds to step 714.

According to steps 704, 706, and 708, at a given scheduling round, WDU 200 schedules GPC 208 to receive a work batch 506 when i) the counter 514 corresponding to the GPC 208 is greater than or equal to max_SM_count, ii) the GPC 208 did not receive a work batch 506 during the previous distribution round, and iii) the GPC 208 has issued load signal 516, respectively. If any of i), ii), or iii) are not met, then WDU 200 does not implement steps 710 or 712, and, thus, WDU 200 does not distribute a work batch 506 to the GPC 208 or decrement counter 514 associated with GPC 208. In either case, the method 700 eventually proceeds to step 714.

Step 714 is implemented for every GPC 208 in the sequence of GPCs. At step 714, WDU 200 determines whether any load signals 516 have been received from GPCs 208 that have a counter 514 that is greater than or equal to max_SM_count. When any GPCs 208 i) have issued load signal 516 and ii) are associated with a counter 514 that exceeds max_SM_count, the method 700 returns to step 704 and proceeds as described above. Otherwise, the method 700 returns to step 702 and proceeds as described above.

In one embodiment, WDU 200 maintains a "greater than" mask, a "not previous" mask, and a "load" mask. The greater than mask specifies GPCs 208 associated with counters 514 that have a value greater than or equal to max_SM_count. The "not previous" mask specifies GPCs 208 that were not distributed to on the previous distribution round. The load mask specifies GPCs 208 that have issued the load signal. The greater than mask can be calculated at step 704, the not previous mask can be calculated at step 706, and the load mask can be calculated at step 708. WDU 200 ANDs some or all of these masks to identify GPCs 208 that should receive work batches 506. WDU 200 then decrements the counters 514 associated with those GPCs 208. With any combination of masks, when the result of the AND operation is all zeros, the method 700 returns to step 702 and WDU 200 increments each counter 514 by the respective SM_count. Through the technique described herein, WDU 200 may perform steps 704, 706, 708, 710, and 712 for each GPC 208 in parallel.

WDU 200 may implement the first policy, as described above, in order to distribute work batches 506 to GPCs 208 based on the number of SMs 510 included within those GPCs. However, the first policy may be inefficient and/or ineffective when the processing time required to process a work batch 506 varies widely between different work batches. In such a situation, a single GPC 208 may become overloaded with processing tasks relative to the other GPCs. The second and third policies, described below in conjunction with FIGS. 8 and 9, respectively, address this specific issue.

Figure 8:
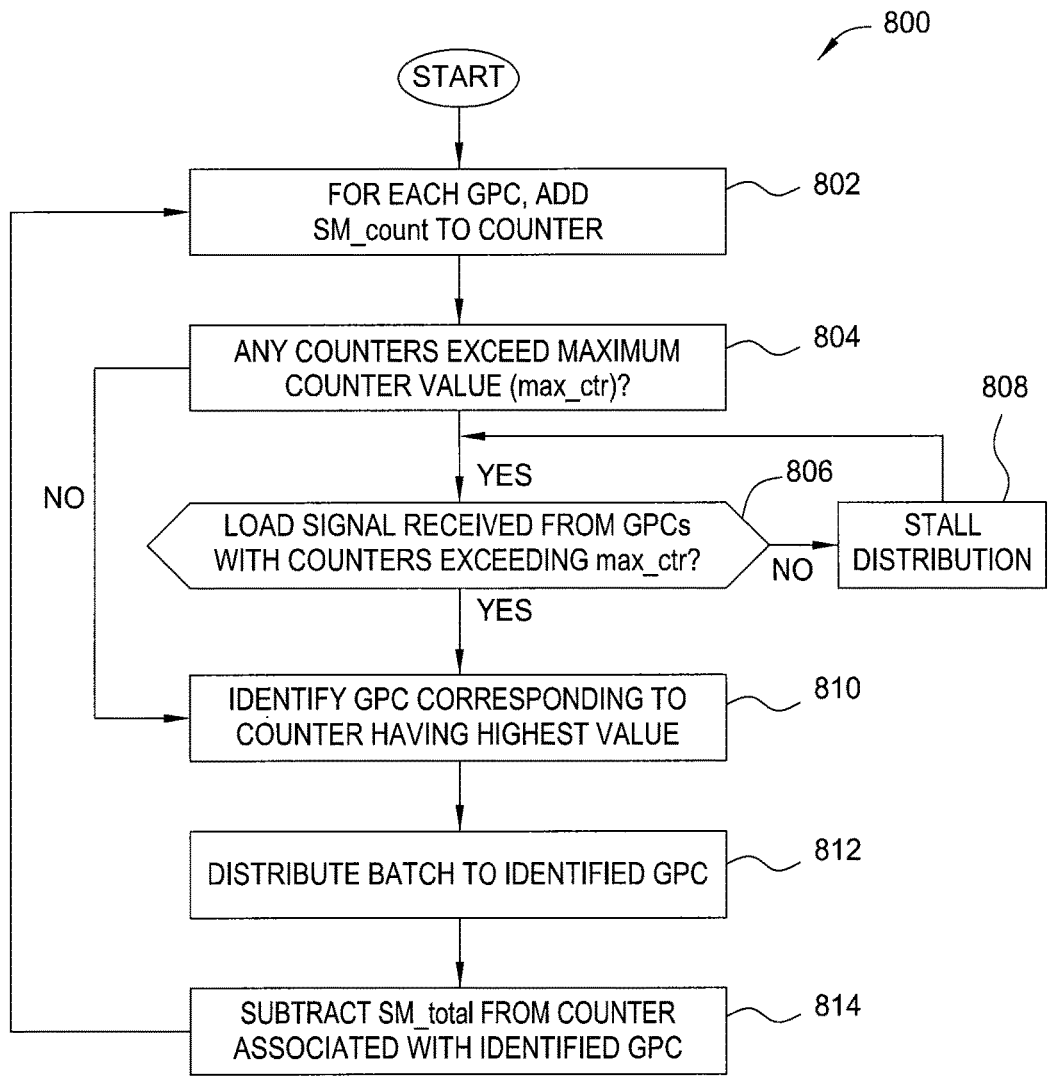
FIG. 8 is a flowchart of method steps for distributing work batches to GPCs when batch processing times vary significantly over time, according to one embodiment of the invention.

FIG. 8 is a flowchart of method steps for distributing work batches to GPCs when batch processing times vary significantly over time, according to one embodiment of the invention. Although the method steps are described in conjunction with the systems of FIGS. 1, 2, 3A, 3B, and 3C, and 5, persons skilled in the art will understand that any system configured to perform the method steps, in any order, is within the scope of the invention.

According to the second policy, as implemented by the method 800, WDU 200 increments each counter 514 by SM_count at each scheduling round, in similar fashion to the first policy. However, unlike the first policy, WDU 200 does not schedule GPCs 208 to receive work batches 506 based on whether counters 514 associated with those GPCs 208 exceed max_SM_count. Instead, WDU 200 identifies the GPC 208 that i) has the highest value of counter 514 and ii) has issued load signal 516. When any of the counters 514 are greater than or equal to a maximum counter value (max_ctr), then WDU 200 stalls distribution to all GPCs 208 until load signals 512 are received from the GPCs 208 associated with the counters that are greater than or equal to the total number of SMs 510 in parallel processing subsystem 112 (SM_total). Through this technique, WDU 200 identifies a situation where a particular GPC 208 has received work batches 506 that require a disproportionate amount of time to process, and, in response, stalls distribution until that GPC "catches up" to the other GPCs 208, as indicated by the load signal 516.

As shown, the method 800 begins at step 802, where WDU 200 adds SM_count to the respective counter 514. As with the first policy, each counter 514 may have any initial value. At step 804, WDU 200 determines whether any counters 514 exceed the maximum counter value, max_ctr. In one embodiment, max_ctr is equal to the maximum counter value that can physically be stored by counters 514. In another embodiment, max_ctr may be different for each counter 514.

If WDU 200 determines that none of counters 514 exceed max_ctr, the method 800 proceeds to step 810. At step 810, WDU 200 identifies the GPC 208 that i) has the highest counter value, ii) has issued a load signal 516, and iii) has a counter value greater than or equal to SM_total. If condition iii is not met, then the distribution returns to step 802. At step 812, WDU 200 distributes a work batch 506 to the identified GPC. At step 814, WDU 200 subtracts SM_total from the counter 514 associated with the identified GPC. The method then returns to step 802 and proceeds as described above.

At step 804, if WDU 200 determines that any of counters 514 exceed max_ctr, then the method 800 proceeds to step 806. At step 806, WDU 200 determines whether a load signal 516 has been received from the GPCs 208 with counters 514 that exceed max_ctr. If WDU 200 determines that no load signals 516 have been received from the GPCs 208 with counters 514 that exceed max_ctr, then the method 800 proceeds to step 808. At step 808, WDU 200 stalls distribution to all GPCs 208 until load signals 516 are received from the GPCs 208 associated with counters 514 that exceed max_ctr. Once those load signals 516 are received, the method proceeds to step 810 and proceeds as described above.

WDU 200 may implement the second policy, as described above, when the time required to process work batches 506 varies significantly. In certain situations, though, stalling distribution according to the second policy is undesirable. As described in conjunction with FIG. 9, the third policy outlines an approach that does not involve stalling the distribution of work batches while still accounting for differences in batch processing times.

Figure 9:
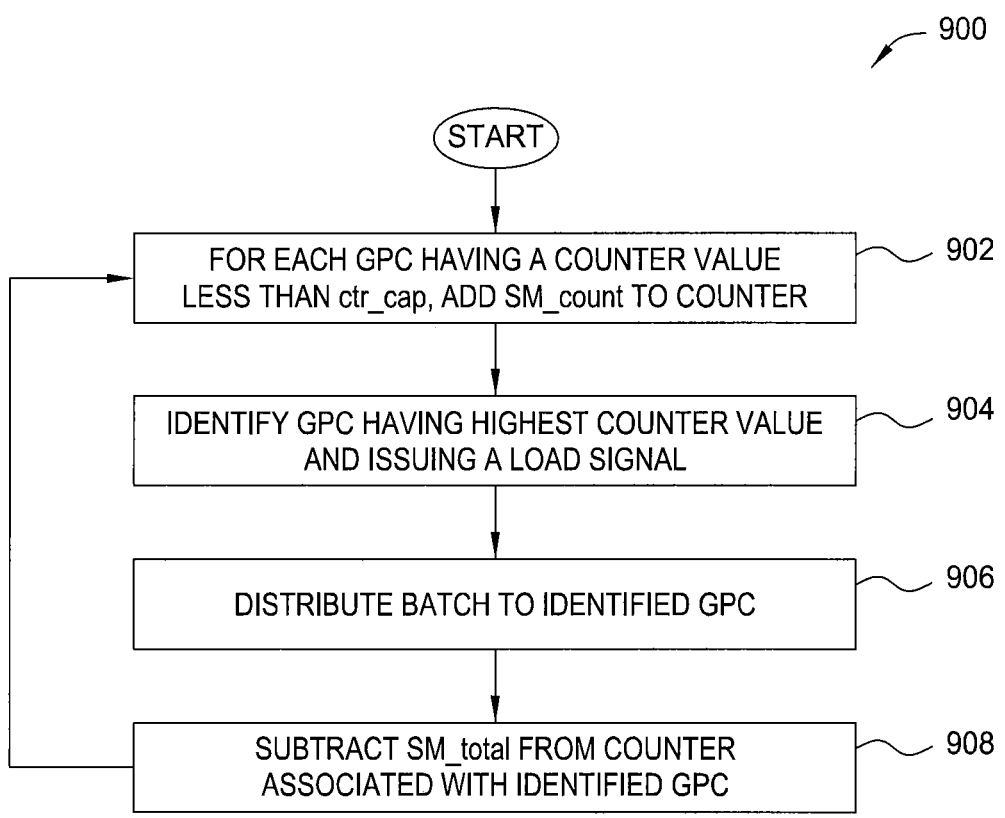
FIG. 9 is a flowchart of method steps for distributing work batches to GPCs when batch processing times vary over time, according to one embodiment of the invention.

FIG. 9 is a flowchart of method steps for distributing work batches 506 to GPCs 208 when batch processing times vary over time, according to one embodiment of the invention. Although the method steps are described in conjunction with the systems of FIGS. 1, 2, 3A, 3B, and 3C, and 5, persons skilled in the art will understand that any system configured to perform the method steps, in any order, is within the scope of the invention.

According to the third policy, as implement by the method 900, WDU 200 increments each counter 514 by SM_count at each scheduling round when the counter 514 does not exceed a "counter cap" value (ctr_cap). When a given counter 514 is greater that or equal to ctr_cap, WDU 200 stops incrementing that counter 514 until the corresponding GPC 208 issues a load signal 516. WDU 200 identifies the GPC 208 that i) has the highest counter value and ii) has issued load signal 516, and then distributes a work batch 506 to the identified GPC.

As shown, the method 900 begins at step 902, where, for each GPC 208 having a counter 514 that is less than ctr_cap, WDU 200 adds SM_count to the counter 514 associated with that GPC. Since SM_count may be different for each GPC 208 and, thus, for each counter 514, WDU 200 may add a different SM_count value to each counter 514.

At step 904, WDU 200 identifies the GPC 208 that i) is associated with the counter 514 having the highest counter value, ii) has issued load signal 516, and iii) has a counter value greater than or equal to the total number of SMs 510 in parallel processing subsystem 112 (SM_total). WDU 200 then distributes a work batch 506 to the identified GPC. At step 908, WDU 200 subtracts SM_total from the counter 514 associated with the identified GPC.

WDU 200 may implement the third policy, as described above, in situations where batch processing times vary over time and distribution should not be stalled.

WDU 200 may implement any of the three policies described herein to distribute work batches 506 to GPCs 208. In one embodiment, WDU 200 dynamically determines a specific policy based on the work batches 506 to be processed.

In sum, a work distribution unit (WDU) distributes batches of processing tasks to general processing clusters (GPCs) according to one of three different work distribution policies. When implementing any of these policies, the WDU distributes work batches to the GPCs based on the number of streaming multiprocessors (SMs) included in each GPC and based on a counter that is maintained for each GPC.

When implementing the first policy, the WDU increments each counter by the number of SMs included in the GPC associated with the counter. When the counter meets or exceeds the maximum number of SMs in any GPC, the WDU distributes a work batch to the GPC and decrements the counter by that maximum number.

When implementing the second policy, the WDU increments each counter by the number of SMs included in the GPC associated with the counter. When any counter reaches a maximum counter value, the WDU stalls distribution until a load signal is received from the GPCs associated with the counters that have reached the maximum counter value. The WDU then distributes work batches to those GPCs following the policy described above.

When implementing the third policy, the WDU increments each counter by the number of SMs included in the GPC associated with the counter until the counter meets or exceeds a counter cap. The WDU then stops incrementing that counter until a load signal is received from the GPC associated with that counter. When the load signal is received, the WDU distributes a work batches to the GPC and decrements the counter accordingly.

Advantageously, when any of the three policies described herein are implemented by the WDU, each GPC receives an amount of work from the WDU that is proportional to the processing power afforded by the GPC. In addition, the WDU may abstain from distributing work batches to some or all of the GPCs in order to balance the workload across all of the GPCs.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for distributing batches of processing tasks to two or more general processing clusters (GPCs), comprising:
    incrementing a counter value for each of the two or more GPCs based on a number of enabled streaming multiprocessors (SMs) within each of the two or more GPCs, wherein the two or more GPCs reside within a parallel processing unit, and each GPC includes at least one SM and is associated with a different counter;
    distributing a batch of processing tasks to a first GPC of the two or more GPCs based on determining that a counter value associated with the first GPC is greater than or equal to a maximum number of enabled SMs in any of the two or more GPCs and based on a load signal received from the first GPC; and
    subtracting the value of the maximum number of enabled SMs in any of the two or more GPCs from the counter value associated with the first GPC.

2. The method of claim 1, wherein the step of distributing the batch of processing tasks to the first GPC occurs during a current distribution round, and the method further comprises abstaining from distributing batches of processing tasks to the first GPC during a directly subsequent distribution round even when conditions for distribution have been met.

3. The method of claim 1, wherein the step of distributing the batch of processing tasks to the first GPC occurs during a current distribution round, the two or more GPCs are arranged in a sequence of GPCs, and the method further comprises reordering the sequence of GPCs during a subsequent distribution round.

4. A non-transitory computer-readable storage medium storing program instructions that, when executed by a processor, distributes batches of processing tasks to two or more general processing clusters (GPCs) by performing the steps of:
    incrementing a counter value for each of the two or more GPCs based on a number of enabled streaming multiprocessors (SMs) within each of the two or more GPCs, wherein the two or more GPCs reside within a parallel processing unit, and each GPC includes at least one SM and is associated with a different counter;
    distributing a batch of processing tasks to a first GPC of the two or more GPCs based on determining that a counter value associated with the first GPC is greater than or equal to a maximum number of enabled SMs in any of the two or more GPCs and based on a load signal received from the first GPC; and
    subtracting the value of the maximum number of enabled SMs in any of the two or more GPCs from the counter value associated with the first GPC.

5. The non-transitory computer-readable storage medium of claim 4, wherein the step of distributing the batch of processing tasks to the first GPC occurs during a current distribution round, and further comprising the step of abstaining from distributing batches of processing tasks to the first GPC during a directly subsequent distribution round even when conditions for distribution have been met.

6. The non-transitory computer-readable storage medium of claim 4, wherein the step of distributing the batch of processing tasks to the first GPC occurs during a current distribution round, the two or more GPCs are arranged in a sequence of GPCs, and further comprising the step of reordering the sequence of GPCs during a subsequent distribution round.

7. The non-transitory computer-readable storage medium of claim 4, wherein the step of distributing the batch of processing tasks to the first GPC is further based on determining that the first GPC did not receive any batch of processing tasks during the previous distribution round.

8. The non-transitory computer-readable storage medium of claim 4, further comprising generating a first mask that specifies one or more GPCs included in the two or more GPCs having a counter value that is greater than or equal to a maximum number of enabled SMs in any of the two or more GPCs, wherein the step of distributing the batch of processing tasks to the first GPC is performed based on the first mask.

9. The non-transitory computer-readable storage medium of claim 4, further comprising generating a second mask that specifies one or more GPCs included in the two or more GPCs to which no batches of processing tasks were distributed during the previous distribution round, wherein the step of distributing the batch of processing tasks to the first GPC is performed based on the second mask.

10. A computer system, comprising:
    a memory device;
    a central processing unit (CPU) coupled to the memory device; and
    a parallel processing subsystem coupled to the CPU and to the memory device and including:
    a work distribution unit (WDU), and
    two or more general processing clusters (GPCs), each including:
    a different counter, and
    one or more enabled steaming multiprocessors (SMs),
    wherein the WDU increments a value stored by the counter for each of the two or more GPCs based on the number of enabled SMs within each of the two or more GPCs,
    wherein the WDU distributes a batch of processing tasks to a first GPC of the two or more GPCs based on determining that the value stored by the counter associated with the first GPC is greater than or equal to a maximum number of enabled SMs in any of the two or more GPCs and based on a load signal received from the first GPC, and wherein the WDU subtracts the value of the maximum number of enabled SMs in any of the two or more GPCs from the value stored by the counter associated with the first GPC.

11. The computer system of claim 10, wherein the WDU distributes the batch of processing tasks to the first GPC during a current distribution round and abstains from distributing batches of processing tasks to the first GPC during a directly subsequent distribution round even when conditions for distribution have been met.

12. The computer system of claim 10, wherein the WDU distributes the batch of processing tasks to the first GPC during a current distribution round, the two or more GPCs are arranged in a sequence of GPCs, and the WDU further reorders the sequence of GPCs during a subsequent distribution round.

* * * * *